United States Patent [19]

Satterwhite

[11] Patent Number: 4,462,972
[45] Date of Patent: Jul. 31, 1984

[54] METHOD FOR PRODUCING FERTILIZER-GRADE PHOSPHORIC ACID

[75] Inventor: William A. Satterwhite, Mulberry, Fla.

[73] Assignee: CF Industries, Inc., Long Grove, Ill.

[21] Appl. No.: 399,834

[22] Filed: Jul. 19, 1982

[51] Int. Cl.$^3$ .............................................. C01B 25/16
[52] U.S. Cl. .................................. 423/320; 423/319; 71/37; 71/40; 422/62
[58] Field of Search .................... 423/319, 320; 71/37, 71/40; 436/55, 103, 106, 119; 422/62

[56] References Cited

U.S. PATENT DOCUMENTS

| | | | |
|---|---|---|---|
| 2,979,385 | 4/1961 | Karasek et al. | 423/320 |
| 3,017,247 | 1/1962 | Huxley | 423/320 |
| 3,104,946 | 9/1963 | Veal | 423/320 |
| 3,178,263 | 4/1965 | Karasek et al. | 422/62 |
| 4,402,923 | 9/1983 | Lang | 423/320 |

FOREIGN PATENT DOCUMENTS 1175966  1/1970  United Kingdom ................. 422/62

OTHER PUBLICATIONS

Quantitative Chemical Analysis, Fourth Edition, I. M. Kolthoff, E. B. Sandell, E. J. Meehan, S. Bruckenstein, 1969, pp. 602–791.

*Primary Examiner*—Gregory A. Heller
*Attorney, Agent, or Firm*—Trexler, Bushnell & Wolters, Ltd.

[57] ABSTRACT

A process for producing fertilizer-grade phosphoric acid is disclosed. In the process, a rock slurry is produced from a predetermined quantity of phosphate rock and a predetermined quantity of pond water neutralized with ammonia. A predetermined rate of sulfuric acid is added to the rock slurry to produce a reaction mixture. The improvement comprises maintaining an excess of sulfate ion in the reaction mixture.

10 Claims, 1 Drawing Figure

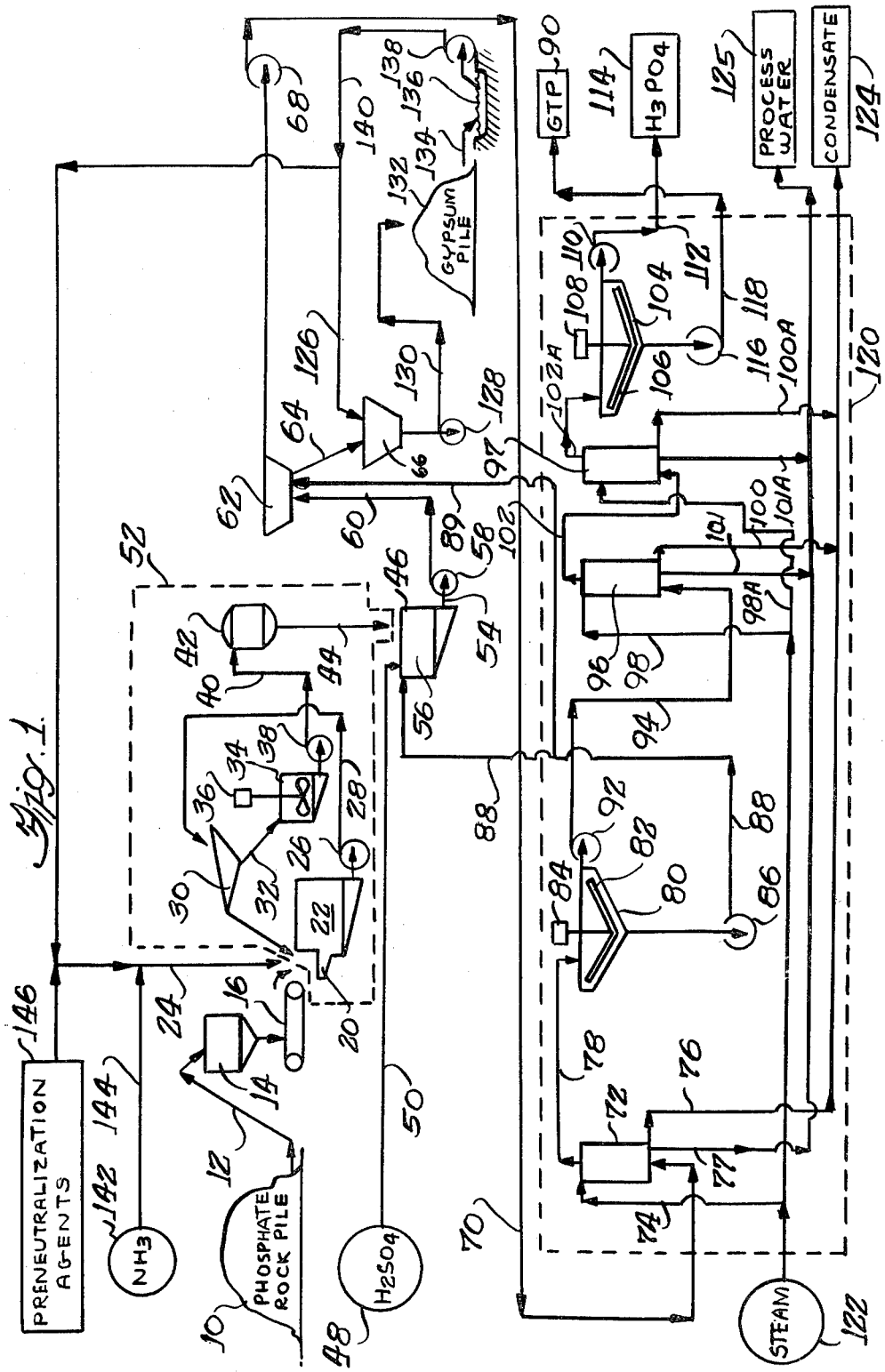

METHOD FOR PRODUCING FERTILIZER-GRADE PHOSPHORIC ACID

BACKGROUND OF THE INVENTION

This invention is directed to a novel method for producing fertilizer-grade phosphoric acid. More particularly, this invention is directed to an improved method for producing fertilizer-grade phosphoric acid when ammonium ion is present in solution in certain process streams of a fertilizer-grade phosphoric acid plant. Still more particularly, the present invention is directed to an improved method for producing fertilizer-grade phosphoric acid by controlling the amount of free sulfate ion present in a phosphoric acid digester.

In a fertilizer-grade phosphoric acid plant, phosphate rock and sulfuric acid are chemically reacted to produce gypsum and phosphoric acid. It is common practice in the industry to convey this gypsum to a site where water (carried by the gypsum) is permitted to drain. Eventually, ponds of water form immediately adjacent to sites where the gypsum is thus conveyed.

It is desirable in the industry to withdraw water from such a pond and thereafter to use this water in a wet rock grinding circuit of the fertilizer-grade phosphoric acid plant. The water being withdrawn from the pond is highly acidic. In the industry, the process equipment of the wet rock grinding circuit is usually fabricated from mild carbon steel. It is well known that severe corrosion problems arise within the wet rock grinding circuit if this acidic water is not neutralized or if other special precautions are not taken. One such special precaution is to fabricate all of the process equipment within the wet rock grinding circuit from stainless steel 316, or another material resistant to acidic attack. Fabricating the process equipment of the wet rock grinding circuit from such material requires a substantial capital outlay, over and above what carbon steel process equipment costs.

A more cost-efficient scheme of using the acidic water from the pond of such a wet rock grinding circuit neutralizes this water before it is added to the circuit to avoid this corrosion problem. An inexpensive neutralizing agent is preferred to keep production costs down. Lime (calcium oxide), and caustic (sodium hydroxide), for example, are readily available neutralizing agents which are expensive and which provide no fertilizer value to the final product.

When neutralizing the acidic pond water, it has been a desideratum to choose a neutralizing agent such that production costs incurred through use thereof, are minimized.

It has recently been discovered that ammonia can be used as one such neutralizing agent. Such discovery is described in a currently pending patent application (by Paul R. Roberts), filed Dec. 1, 1982, bearing Ser. No. 446,005, which is a continuation of a patent application filed Apr. 24, 1981, having Ser. No. 257,492 (now abandoned). The Roberts' application, like the present application, has been assigned to CF Industries, Incorporated, of Long Grove, Ill., and is incorporated herein by reference. Briefly, the Roberts' application teaches that using ammonia as such a neutralizing agent advantageously increases the nitrogen content of the fertilizer-grade phosphoric acid being produced. Accordingly, since this acid is used to produce a variety of N-P-K fertilizer products, it reduces the cost of nitrogen required to produce the N-P-K products.

In practicing the Roberts' invention, however, a new problem has been discovered.

It is currently the practice to determine qualitatively, the sulfate ion concentration present in a reactor wherein sulfuric acid and phosphate rock are chemically converted to phosphoric acid and gypsum. Such a reactor is referred to in the industry as a "phosphoric acid digester".

Briefly, this qualitative method of analysis employs barium chloride as a precipitant in a procedure employing a centrifugation procedure for recovery of a barium sulfate precipitate. It is common practice to relate qualitatively (via a chart or otherwise) the amount of the barium sulfate precipitate to sulfate ion concentration within the reactor.

It is the current industry practice to use the results of this qualitative method of analysis to adjust the rate of sulfuric acid into the reactor. It is also current practice to choose a rate of sulfuric acid sufficient to provide an excess of from about 1% to about 4% of sulfate ion in the reactor. The basic reaction occurring in the phosphoric acid digester is presented below in equation 1:

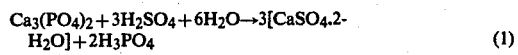

$$Ca_3(PO_4)_2 + 3H_2SO_4 + 6H_2O \rightarrow 3[CaSO_4 \cdot 2H_2O] + 2H_3PO_4 \qquad (1)$$

Upon practicing the Roberts' invention, I have observed that an entirely unexpected and undesirable precipitate forms in the acid concentrating circuit of the fertilizer-grade phosphoric acid plant when the phosphoric acid is concentrated. The 51%–54% $P_2O_5$ phosphoric acid, for example, becomes extremely difficult to clarify and transport because of the precipitate. Such precipitate has been analyzed by X-ray defraction techniques. Although gypsum and fluosilicates (various salts of fluosilicic acid) were detected in this X-ray defractogram, the bulk of this undesirable precipitate is an ammonium-iron-phosphate complex which can be represented by the chemical formula

$$Fe_3NH_4H_{14}(PO_4)_8 \cdot 4H_2O$$

I have, subsequently, discovered that in the practice of the Roberts' invention, the qualitative method described above is ineffective for determining the proper amount of sulfate ion concentration needed in the phosphoric acid digester because such qualitative method is insensitive to certain effects of ammonia addition to acidic pond water.

The acidic pond water contains varying amounts of sulfuric acid and phosphoric acid. The neutralizing effect of the ammonia to this acidic pond water is chemically expressed below in equations 2 through 6. These equations represent classical theoretical conversions of sulfuric acid and phosphoric acid to certain ammonium salts.

$$NH_3 + H_2SO_4 \rightarrow NH_4HSO_4 \qquad (2)$$

$$2NH_3 + H_2SO_4 \rightarrow (NH_4)_2SO_4 \qquad (3)$$

$$NH_3 + H_3PO_4 \rightarrow NH_4H_2PO_4 \qquad (4)$$

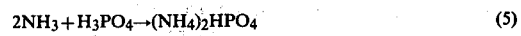

$$2NH_3 + H_3PO_4 \rightarrow (NH_4)_2HPO_4 \qquad (5)$$

$$3NH_3 + H_3PO_4 \rightarrow (NH_4)_3PO_4 \qquad (6)$$

In equation 2, ammonia and sulfuric acid chemically combine to form ammonium bisulfate. In equation 3, ammonia and sulfuric acid chemically combine to form ammonium sulfate. In equation 4, ammonia and phosphoric acid chemically combine to form monoammonium phosphate. In equation 5, ammonia and phosphoric acid chemically combine to form diammonium phosphate. In equation 6, ammonia and phosphoric acid chemically combine to form triammonium phosphate.

Not all of these ammonium salts are present in the phosphoric acid digester simultaneously, of course, because acidic pH of the digester solution primarily favors the product side of equations 2 and 4. However, slight changes in the digester pH toward neutrality can shift equations 3 and 5 to the product side also. Before equation 6 shifts to the product side, however, the solution pH of the phosphoric acid digest has to be alkaline.

I have discovered, surprisingly, that to avoid formation and precipitation of the ammonium-iron-phosphate complex in the concentrated phosphoric acid it is essential to maintain a "free sulfate" ion concentration of about 1% to about 2% in excess of the sulfate ion concentration required to meet the calcium ion chemical demand (represented by equation 1) and the ammonium ion chemical demand (represented by equations 2 through 6), present in the solution within the phosphoric acid digester. It was previously thought that the correct concentration was an excess based upon equation 1 alone. The "free sulfate" ion concentration is defined as the balance remaining after the calcium ion and the ammonium ion chemical demands are accounted for.

If an adequate free sulfate ion concentration is not maintained, crystal nucleation, formation and growth rates of the gypsum within the phosphoric acid digester, have been observed to become adversely affected. But more importantly, if a slight excess of free sulfate ion is not properly maintained in the phosphoric acid digester, the ability of the plant to produce marketable fertilizer-grade phosphoric acid will also be adversely affected because of the formation of the undesirable precipitate in the acid-concentrating circuit of the fertilizer-grade phosphoric acid plant.

OBJECTS AND SUMMARY OF THE INVENTION

Accordingly, it is a general object of this invention to provide a method for preventing the undesirable precipitate, currently believed to be $Fe_3NH_4H_{14}(PO_4)_8.4H_2O$, from forming in an acid concentrating circuit of a process wherein fertilizer-grade phosphoric acid is produced from phosphate rock.

Yet another object is to provide a novel and improved method for maintaining, in a reaction vessel, about 1% to about 2% of excess sulfate ion concentration beyond what is theoretically required for 100% conversion of phosphoric acid and gypsum from sulfuric acid and phosphate ore.

A more specific object is to provide an improved method of maintaining such an excess of sulfate ion in a phosphoric acid digester of a fertilizer-grade phosphoric acid plant.

A related object is to provide such a method for quantitatively determining the amount of free sulfate ion concentration present in a process stream containing calcium and ammonium ions and sulfuric and phosphoric acids.

A further object is to provide such a method for quantitatively determining the amount of free sulfate ion concentration present in a process stream containing about 0.5% or more of ammonium ion, from about 1% to about 2% of sulfuric acid, and the remainder being phosphoric acid ranging from about 26% to about 30% $P_2O_5$.

A related object is to provide a method for quantitatively determining that the amount of sulfate ion concentration present in a reaction solution containing ammonium ion, phosphoric acid and calcium sulfate is sufficient to promote desired nucleation, crystal growth and precipitation of gypsum crystals within the reactor.

Briefly, and in accordance with the foregoing objects, an improved method for producing fertilizer-grade phosphoric acid begins by taking a stream of acidic pond water. The acidic pond water is neutralized continuously using an effective amount of a neutralization agent to produce a neutralized stream of pond water. The present invention can be appreciated when it is used in connection with a fertilizer-grade phosphoric acid production process incorporating the Roberts' invention. The neutralization agent thus includes ammonia, and the neutralized pond water therefore contains ammonium ion.

The neutralized stream of pond water has a pH range of from about 6 to about 7. After being neutralized, this pond water is continuously introduced into the wet rock grinding circuit of the fertilizer-grade phosphoric acid plant. The stream of neutralized pond water is continuously supplied to a grinding mill with a predetermined quantity of phosphate rock to produce a phosphate rock slurry.

The phosphate rock slurry and a stream of sulfuric acid are thereafter continuously admixed, under controlled conditions, into a phosphoric acid digester. This admixing, thus, produces a digester solution containing a quantity of gypsum, a quantity of phosphoric acid, a quantity of sulfate ion, and a quantity of ammonium ion.

In a process incorporating the Roberts' invention whereby a fertilizer-grade phosphoric acid is produced, the improvement comprises obtaining approximately simultaneously at least three different samples of the digester solution at predetermined intervals and qualitatively testing each sample. Then, the results of these quantitative tests are used to adjust the rate of addition of sulfuric acid into the phosphoric acid digester so that an excess of about 1% to about 2% of sulfate ion is maintained in the digester beyond what would be required to meet or equate a calcium ion chemical demand and an ammonium ion chemical demand present within the digester.

One quantitative test determines the percentage of ammonium ion present in the digester solution. A second quantitative test determines the percentage of sulfate ion present in the digester solution. A third quantitative test determines the percentage of phosphorus present in the digester solution. These quantitative tests are performed at approximately the same time. These three tests are also performed employing well known procedures for quantitative analysis.

The present discovery thus permits the use of ammonia or neutralization agents containing ammonia for neutralizing acidic pond water. But more importantly, the present discovery permits the determination of the sulfate ion concentration in the digester for maintaining an excess of free sulfate ion concentration thereby avoiding the formation of the undesirable precipitate within the acid-concentrating circuit.

BRIEF DESCRIPTION OF THE DRAWING

The foregoing as well as other objects, features and advantages of the present invention will become more readily understood upon reading the following detailed description of the illustrated embodiment, together with reference to the included drawing.

The drawing is a process flow or schematic diagram of a fertilizer-grade phosphoric acid plant incorporating the Roberts' invention, herein provided for the purpose of illustrating the present discovery. In such a plant, acidic pond water is neutralized with certain neutralization agents to a pH of from about 6 to about 7 and thereafter introduced into the wet rock grinding circuit. These neutralization agents include ammonia; and ammonia can be the sole neutralization agent. The phosphoric acid digester of such a plant thus contains ammonium ion in solution form.

DETAILED DESCRIPTION OF THE ILLUSTRATED EMBODIMENT

Phosphate ore, indicated in the drawing by a phosphate rock pile 10, is fed via an inclined coveyor 12 or other conveyor means to a feed hopper 14 and, thereafter, onto a weigh-belt scale 16. Thereafter, the ore is fed through an inlet 20 of a ball mill 22. Water is added to the ball mill 22 via a conduit 24 in amounts sufficient to produce a slurry within the ball mill 22, and for subsequent hydraulic transport therefrom. The phosphate rock concentration of the slurry is maintained preferably at from about 25% to about 35% by weight within the ball mill 22. From the ball mill 22 the slurry is conveyed, by a pump 26 or other means, through a conduit 28 and onto a particle sizing assembly 30 or other classification device, which returns the oversized particles to the ball mill inlet 20. The finished ground rock slurry is conveyed through an outlet 32 and into a surge tank 34. The surge tank 34 preferably contains a finished ground rock slurry of from about 65% to about 75% solids, with the majority of the pulverized or finely ground phosphate rock passing through a 30-mesh Tyler screen. The surge tank 34 further includes an agitation device 36, thereby providing means for suspending the phosphate rock slurry particles within the surge tank 34.

From the surge tank 34, the slurry is conveyed by a pump 38 through a conduit 40 and into a head tank 42. From the head tank 42, the phosphate rock slurry flows at a predetermined rate through a conduit 44 and into a phosphoric acid digester 46. Sulfuric acid from a sulfuric acid($H_2SO_4$) source 48 also is supplied at a predetermined rate through a conduit 50 and into the phosphoric acid digester 46 wherein the following chemical reaction takes place:

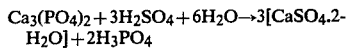
$Ca_3(PO_4)_2 + 3H_2SO_4 + 6H_2O \rightarrow 3[CaSO_4.2H_2O] + 2H_3PO_4$ In addition, a number of other reactions occur within the phosphoric acid digester 46. By such other reactions, various minor constituents of the phosphate ore such as iron and aluminum oxide, silica, carbonates, sulfates and chlorides react and interact to produce varying amounts of calcium sulfate, sodium and potassium fluosilicates, iron and aluminum phosphates and trace amounts of other substances.

In a fertilizer-grade phosphoric acid plant, a wet rock grinding circuit 52 generally includes the ball mill 22, the sizing assembly 30, the surge tank 34 and the head tank 42 as major pieces of process equipment.

From an outlet 54 of the phosphoric acid digester 46, a digester slurry 56 is conveyed, by a pump 58, through a conduit 60 and into a continuous filtration device 62. Within the filtration device 62, the gypsum and other particles are continuously removed from the digester slurry 56. From the filtration device 62, the filtered gypsum and particles are discharged through a conduit 64 and into a hopper 66.

The filtration device 62 continuously produces a filtered solution containing primarily phosphoric, some sulfuric and trace amounts of other acids. From the filtration device 62, the filtered acid is continuously conveyed by a pump 68 or other means through a conduit 70 and into a first evaporator, such as a steam-tube evaporator 72. When operating in a normal fashion, the first steam-tube evaporator 72 uses steam supplied via a conduit 74, produces condensate (from the condensing steam), which is conveyed away from the first steam-tube evaporator 72 through a conduit 76, and concentrates the filtered acid from about 26%-30% $P_2O_5$ initially to about 40% $P_2O_5$. Such concentrating from the initial 26% to 30% $P_2O_5$ range produces a quantity of vapor which upon condensing (to a process water) is conveyed away from the first steam-tube evaporator 72 through a conduit 77.

From the first steam-tube evaporator 72, the 40% $P_2O_5$ phosphoric acid is conveyed through a conduit 78 and into a first clarification device, such as a first mechanical rake clarifier 80, wherein this 40% $P_2O_5$ phosphoric acid is allowed to age and impurities are permitted to settle out. The first mechanical rake clarifier 80 includes a raking device 82 and a drive motor 84 therefor. Within the first mechanical rake clarifier 80, the phosphoric acid is aged for about 24 to about 48 hours. The phosphoric acid supplied by the conduit 78 into the first clarifier 80 includes about 5% solids by weight as impurities, based on total solids. The normal operation of the first mechanical rake clarifier 80 reduces the impurity level of the phosphoric acid to about 1.5% total solids. From the first mechanical rake clarifier 80, a thickened solution (containing mostly settled solids of gypsum and fluosilicates) is conveyed by a pump 86 through a conduit 88 and thereafter either back into the digester 46 or through a conduit 89 and back into the filtration device 62.

From the first mechanical rake clarifier 80, aged phosphoric acid of about 40% $P_2O_5$ is conveyed, by pump 92 or other means through a conduit 94, and thereafter is introduced into a second evaporator. One such evaporator is a second steam-tube evaporator 96. The second steam-tube evaporator 96 uses steam supplied through a conduit 98 to concentrate the 40% $P_2O_5$ to about 47% $P_2O_5$, thereby generating condensate. As it is being generated, this condensate (from the condensing steam) is continuously conveyed away from the second steam-tube evaporator 96 through a conduit 100. When operating in a normal fashion, the second steam-tube evaporator 96 concentrates the 40% $P_2O_5$ phosphoric acid to about 47% $P_2O_5$ and a third steam-tube evaporator 97 concentrates the 47% $P_2O_5$ to about 54% (51%-54%) $P_2O_5$, which is the preferred concentration of the fertilizer-grade phosphoric acid being sold as product. In concentrating the 40% $P_2O_5$ phosphoric acid to 54% $P_2O_5$, the second and third steam-tube evaporators 96,97 produce a quantity of vapor which, upon condensing (to process water), is conveyed away from the second steam-tube evaporator 96 via a conduit 101 and is conveyed away from the third steam-tube evaporator 97 via a conduit 101A. As the third steam-tube evaporator 97 concentrates the 47% $P_2O_5$ phosphoric acid to about 54% $P_2O_5$, it uses steam supplied through a conduit 98A, the condensate from the condensing steam being continuously conveyed away from the third steam tube evaporator 97 via a conduit 100A. The 47% $P_2O_5$ phosphoric acid is supplied to the third steam-tube evaporator 97 from the second steam-tube evaporator 96 via a conduit 102.

The 54% $P_2O_5$ fertilizer-grade phosphoric acid is conveyed via a conduit 102A away from the third steam-tube evaporator 97 and thereafter into a second clarification device, such as a second mechanical rake clarifier 104. The second mechanical rake clarifier 104 reduces the level of impurities in the fertilizer-grade phosphoric acid from about 4%, to about 1.5%, based on the total solids. The fertilizer-grade phosphoric acid is aged within the second mechanical rake clarifier 104 for about 24 to about 72 hours. The second mechanical rake clarifier 104 also includes a raking device 106 and a drive motor 108 therefor.

From the second mechanical rake clarifier 104, the clarified and aged fertilizer-grade phosphoric acid is conveyed by a pump 110 through a conduit 112 and thereafter into a fertilizer-grade phosphoric acid ($H_3PO_4$) storage facility 114. From the second mechanical rake clarifier 104, impurities are conveyed in slurry form by a pump 116 through a conduit 118 and thereafter to a granular triple phosphate (G T P) operation 90.

Within the fertilizer-grade phosphoric acid plant, an acidconcentrating circuit 120 generally includes the first, second and third steam-tube evaporators 72, 96 and 97 and the first and second mechanical rake clarifiers 80 and 104 as major pieces of process equipment. Thus, the acidconcentrating circuit 120 concentrates 26-30% $P_2O_5$ phosphoric acid to 51-54% $P_2O_5$, ages and clarifies the acid, draws steam from a steam source 122, generates condensate and process water, and thereafter, respectively, conveys the condensate and process water to a condensate storage facility 124 and a process water storage facility 125 for further use.

A predetermined quantity of water, conveyed via a conduit 126, is introduced into the hopper 66 so that the gypsum therein can be slurried and, thus, easily pumped away. From the hopper 66, such a gypsum slurry is conveyed by a pump 128 through a conduit 130 to a gypsum pile 132. Run-off from the gypsum pile 132, generally referred to by the reference numeral 134, collects in a pond 136. The water within this pond 136 is highly acidic in nature. Some of the water from the pond 136 is conveyed, by a pump 138 or other means, through a conduit 140, through the conduit 126 and into the hopper 66 to slurry the gypsum, as described above.

Prior to the Roberts' invention, a fertilizer-grade phosphoric acid plant generally operated as described above. The sulfate ion concentration in the digester solution 56 was maintained at from about 1% to about 4% excess sulfate ion, in the digester 46. Such excess was purposefully maintained to ensure proper gypsum crystal nucleation and formation and desired crystal growth rate and final size.

To determine sulfate ion concentration present within the phosphoric acid digester 46, a qualitative test was employed. The qualitative test used barium chloride as a precipitant and a centrifugation procedure for recovery of a barium sulfate precipitate.

In performing this qualitative test, a sample of digester solution 56 was obtained, preferably from the conduit 60. Barium chloride was added to a portion of this sample; whereupon a precipitate of barium sulfate was formed. Substantially, all of the barium sulfate which formed was, thereafter, caused to accumulate, via a centrifugation procedure, and the volume of barium sulfate that accumulated was noted. Thereafter, a standard chart was used to relate that volume of barium sulfate to an amount of sulfate ion present within the phosphoric acid digester solution 56.

The Roberts' invention advantageously permits the acidic water from the pond 136 to be neutralized by certain neutralization agents, including ammonia.

Using the Roberts' invention, the acidic water from the pond 136 is neutralized with ammonia stored in an ammonia storage facility 142. From such ammonia storage facility 142, this ammonia is conveyed through a conduit 144 and, thereafter, mixed with the acidic water from the pond 136 to produce a neutralized stream of pond water having a pH of from about 6 to about 7. Thereafter, this neutralized pond water is conveyed through the conduit 24 and into the wet rock grinding circuit 52 for purposes of wet milling the phosphate rock.

Using the Roberts' invention, certain pre-neutralization agents from a pre-neutralization agent storage facility 146 can be added to the acidic water from the pond 136 for pre-neutralization purposes prior to addition of the ammonia. These pre-neutralization agents can include lime, caustic, and phosphate rock.

Under the Roberts' invention, the acidic water from the pond 136 (being conveyed through the conduit 24 and into the wet rock grinding circuit 52) is preferably neutralized to about pH 7, when using ammonia alone. When pre-neutralization agents are added to the acidic water (from the pond 136) prior to ammonia addition, the water is preferably neutralized by the ammonia to about pH 6.

Using the Roberts' invention, the acidic water from the pond 136 is thus neutralized becoming ammonia-containing pond water which is thereafter conveyed through the conduit 24 and into the wet rock grinding circuit 52. This ammonia-containing pond water contains an appreciable ammonium ion concentration. Thus, an appreciable concentration of ammonium ion passes through the wet rock grinding circuit 52 and into the phosphoric acid digester 46.

It has been discovered that an ammonium ion concentration in excess of 0.5% within the phosphoric acid digester solution 56, disadvantageously interferes with the above-described qualitative test for sulfate ion concentration determination.

It has also been discovered that a slight excess of sulfate ion concentration can be maintained within the phosphoric acid digester 46 by employing at least three quantitative tests. One test determines the ammonium ion concentration present in the digester solution 56 of the phosphoric acid digester 46. A second test determines the concentration of phosphorus within the phosphoric acid digester 46. A third test determines the amount of sulfate ion concentration present.

These three tests are well known quantitative tests of chemical analysis. The tests are presented in greater detail in a text entitled *Quantitative Chemical Analysis,* Fourth Edition by Kolthoff, Sandell, Meehan and Brukenstein, Copyright 1969, pages 602, 642-644, 789-791. Quantitative procedures presented in this text are briefly outlined below.

Quantitative Determination Of Ammonium Ion Concentration

1. A sample of the digester solution 56 is obtained.
2. A strong base, such as sodium hydroxide, is added to this sample thereby producing a mixture.
3. This mixture is thereafter distilled. From this mixture, ammonia is quantitatively expelled into a solution containing an excess of standard acid.
4. Thereafter, the solution of acid is back-titrated to quantitatively determine the amount of ammonia expelled from the mixture.
5. The amount of ammonia and the volume of the digester solution 56, thus, determine the ammonium ion concentration within the phosphoric acid digester 46.

Quantitative Determination Of Phosphorus Concentration

1. A sample of the digester solution 56 is obtained. (Because interfering substances such as calcium and iron are present in the sample withdrawn from the phosphoric acid digester 46, phosphorus is separated from these interfering substances via precipitation as ammonium phosphomolybdate in acid medium).
2. A nitric acid solution containing a quantity of ammonium molybdate is added to this sample thereby producing a mixture.
3. Thereupon, a yellow precipitate of ammonium phosphomolybdate forms within the mixture.
4. Thereafter, the ammonium phosphomolybdate precipitate is washed with ammonium nitrate solution, the washing converting the precipitate into a triammonium salt.
5. Thereafter, the triammonium salt is dried and weighed.
6. The dried sample is ignited and the residue weighed.
7. A proportionate amount of phosphorus present within the digester solution 56 is thus determined quantitatively using these weight differences.
8. This amount of phosphorus and the volume of the digester solution 56 thus determine the phosphorus concentration within the phosphoric acid digester 46.

Quantitative Determination Of Sulfate Ion Concentration

1. A sample of digester solution 56 is obtained.
2. A dilute solution of barium chloride is added to this sample thereby producing a mixture.
3. Whereupon, a barium sulfate precipitate forms in the mixture.
4. The barium sulfate precipitate is washed, collected, weighed and thereafter ignited in a lab kiln at 1800° Fahrenheit.
5. Upon cooling, the barium sulfate is weighed.
6. This weight determination and the volume of the digester solution 56, thus determine the sulfate ion concentration within the phosphoric acid digester 46.

Thus, I have discovered that when at least these three quantitative methods of analysis are performed on different samples from the phosphoric acid digester 46, the sulfate ion concentration present within the digester solution 56 can be maintained at an excess. For purposes of promoting a desired gypsum nucleation and crystal growth rate, a slight excess of free sulfate ion is required within the phosphoric acid digester 46.

I have further discovered that controlling the free sulfate ion concentration in the phosphoric acid digester 46 at from about 1% to about 2% advantageously blocks the formation of the undesirable ammonium-iron-phosphate complex which would otherwise precipitate in the acid-concentrating circuit of the fertilizer-grade phosphoric acid plant.

I have additionally discovered that the above-described quantitative test for sulfate ion concentration determination can be substituted by the above-described qualitative test for sulfate ion concentration. Thus, a desired sulfate ion concentration excess can be controlled within the phosphoric acid digester 46 when the sulfate ion concentration qualitative test is performed in conjunction with the above-described quantitative tests for phosphorus and ammonium ion concentration determination, respectively.

What has been illustrated and described herein is an improved method for producing fertilizer-grade phosphoric acid. While the invention has been illustrated and described with reference to a preferred embodiment, the invention is not limited thereto. On the contrary, alternatives, changes or modifications may become apparent to those skilled in the art upon reading the foregoing description. Accordingly, such alternatives, changes and modifications are to be considered as forming a part of the invention, insofar as they fall within the spirit and scope of the appended claims.

I claim:

1. In a process for producing fertilizer-grade phosphoric acid, said process including continuously combining phosphate rock and water neutralized with ammonia to produce a stream of phosphate rock slurry, continuously adding to said rock slurry stream a predetermined, adjustable rate of sulfuric acid to produce a reaction mixture including phosphoric acid, ammonium ion and sulfate ion, wherein the improvement comprises: approximately simultaneously obtaining over a plurality of preselected time intervals at least three samples of said mixture for testing; quantitatively testing subsequent to each one of said plurality of time intervals a first one of said three samples to determine amount of ammonium ion present in said mixture; quantitatively testing subsequent to each one of said plurality of time intervals a second one of said three samples to determine amount of phosphoric acid present in said mixture; quantitatively testing subsequent to each one of said plurality of time intervals a third one of said three samples to determine amount of sulfate ion present in said mixture; and continuously adjusting said sulfuric acid rate in response to said ammonium ion amount, said phosphoric acid amount and said sulfate ion amount thus determined subsequent to each said one of said plurality of time intervals for continuously maintaining in said mixture a predetermined excess amount of sulfate ion and wherein said ammonium ion amount, said phosphoric acid amount and said sulfate ion amount determined subsequent to each said one of said plurality of time intervals are used for approximately determining a theoretical sulfate ion demand present in said mixture at each said one of said plurality of time intervals; and wherein said predetermined sulfate ion excess amount ranges from about 1% to about 2% more than said theoretical sulfate ion demand.

2. The process of claim 1 wherein said third one of said three samples is qualitatively tested subsequent to each said one of said plurality of time intervals, instead of being quantitatively tested, to determine said sulfate ion amount present in said mixture for continuously maintaining in said mixture said predetermined sulfate ion excess amount.

3. In a process for producing fertilizer-grade phosphoric acid, said process including continuously adding to a stream of acidic water a predetermined rate of an ammonium ion-containing neutralization agent to neutralize said acidic water and alter acidity thereof thereby producing a stream of neutralized ammonium ion-containing water having a pH ranging from about 6 to about 7, continuously combining in a first vessel phosphate rock and said neutralized ammonium ion-containing water stream to produce a stream of phosphate rock slurry, continuously admixing in a second vessel a predetermined, adjustable rate of sulfuric acid and said rock slurry stream to produce a reaction mixture including phosphoric acid, gypsum, calcium ion, ammonium ion and sulfate ion, wherein the improvement comprises: approximately simultaneously obtaining over a plurality of preselected time intervals at least three samples of said mixture for testing; quantitatively testing subsequent to each one of said plurality of time intervals a first one of said three samples to determine amount of ammonium ion present in said mixture; quantitatively testing subsequent to each one of said plurality of time intervals a second one of said three samples to determine amount of phosphoric acid present in said mixture; quantitatively testing subsequent to each one of said plurality of time intervals a third one of said three samples to determine amount of sulfate ion present in said mixture; and continuously adjusting said sulfuric acid rate in response to said ammonium ion amount, said phosphoric acid amount and said sulfate ion amount thus determined subsequent to each said one of said plurality of time intervals for continuously maintaining in said second vessel a predetermined excess amount of sulfate ion and wherein said predetermined excess amount of sulfate ion in said second vessel is an effective amount for precluding formation of an ammonium-iron-phosphate complex when said phosphoric acid is subsequently concentrated to from about 51% to about 54% $P_2O_5$.

4. The process of claim 3 wherein said neutralized ammonium ion-containing water stream has a pH of about 7 when said neutralization agent is ammonia.

5. The process of claim 3 wherein said acidic water stream is obtained from a pond formed from gypsum runoff.

6. The process of claim 3 wherein said third one of said three samples is qualitatively tested subsequent to each said one of said plurality of time intervals, instead of being quantitatively tested, to determine said sulfate ion amount present in said mixture for continuously maintaining in said second vessel said predetermined sulfate ion excess amount.

7. The process of claim 3 wherein said ammonium ion amount, said phosphoric acid amount and said sulfate ion amount determined subsequent to each said one of said plurality of time intervals are used for approximately determining a theoretical sulfate ion demand present in said second vessel at each said one of said plurality of time intervals; and wherein said predetermined sulfate ion excess amount ranges from about 1% to about 2% more than said theoretical sulfate ion demand.

8. The process of claim 3 wherein said neutralized ammonium ion-containing water stream has a pH of about 6.

9. The process of claim 3 wherein said reaction mixture includes phosphoric acid ranging from about 26% to about 30% $P_2O_5$.

10. The process of claim 9 further comprising concentrating in concentrators said phosphoric acid from about 26–30% $P_2O_5$ to about 51–54% $P_2O_5$ with substantially no formation in said concentrators of said ammonium-iron-phosphate complex.

* * * * *